US009008204B1

(12) United States Patent
Dick (10) Patent No.: US 9,008,204 B1
(45) Date of Patent: Apr. 14, 2015

(54) OFDM OF SIGNALS ONTO A SAME RF PORT (71) Applicant: Xilinx, Inc., San Jose, CA (US)

(72) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/267,853

(22) Filed: May 1, 2014

(51) Int. Cl.
  *H04L 27/28* (2006.01)
  *H04K 1/10* (2006.01)
  *H04L 27/26* (2006.01)

(52) U.S. Cl.
  CPC .................................. *H04L 27/2627* (2013.01)

(58) Field of Classification Search
  USPC .......................... 375/133, 146, 219, 260, 295
  See application file for complete search history.

(56) References Cited

U.S. PATENT DOCUMENTS

| 8,090,037 B1 * | 1/2012 | Harris et al. ................... 375/260 |
| 2013/0094602 A1 * | 4/2013 | Cimini et al. ................. 375/267 |
| 2013/0279452 A1 * | 10/2013 | Liu ............................... 370/329 |

* cited by examiner

*Primary Examiner* — Ted Wang
(74) *Attorney, Agent, or Firm* — W. Eric Webostad (57) ABSTRACT

An apparatus relates generally to OFDM. In this apparatus, modulators are coupled to receive data inputs. Each of the modulators includes IDFT blocks coupled to output a first and a second N-point transform, and a 2N-point transform to provide discrete time domain signals for the data inputs. A switch and frequency translation block is coupled to receive the discrete time domain signals. RF ports are coupled to the switch and frequency translation block. The switch and frequency translation block is configured to allocate a combination of outputs from two or more of the IDFT blocks to a same RF port of the RF ports and to translate frequency of at least one of the outputs from the two or more of the IDFT blocks to provide the OFDM of the outputs from the two or more of the IDFT blocks onto the same RF port of the RF ports.

20 Claims, 8 Drawing Sheets

OFDM OF SIGNALS ONTO A SAME RF PORT

FIELD OF THE INVENTION

The following description relates to integrated circuit devices ("ICs"). More particularly, the following description relates to Orthogonally Frequency-Division Multiplexing ("OFDM") for an IC onto a same RF port.

BACKGROUND

Orthogonally Frequency-Division Multiplexing ("OFDM") may be used in digital television, wireless local area networks, and cellular networks, among other applications. In the United States, a cable network compliant with Docsis 3.0 used a single carrier quadrature amplitude modulation ("QAM") scheme that consumed all available spectrum. However, digital video broadcasting in other countries have used OFDM. A next generation of cable networks in the United States may be compliant with Docsis 3.1, which specification adds in using multi-carrier OFDM.

Accordingly, it would be useful and desirable to provide more flexibility in data delivery to exploit OFDM in a cable network.

SUMMARY

An apparatus relates generally to Orthogonally Frequency-Division Multiplexing ("OFDM"). In such an apparatus, modulators are coupled to receive data inputs. Each of the modulators includes Inverse Discrete Fourier Transform ("IDFT") blocks. The IDFT blocks are coupled to output a first N-point transform, a second N-point transform, and a 2N-point transform from each of the modulators to provide discrete time domain signals for the data inputs. The 2N-point transform is a combination of the first N-point transform and the second N-point transform. A switch and frequency translation block is coupled to receive the discrete time domain signals. RF ports are coupled to the switch and frequency translation block. The switch and frequency translation block is configured to allocate a combination of outputs from two or more of the IDFT blocks to a same RF port of the RF ports and to translate frequency of at least one of the outputs from the two or more of the IDFT blocks to provide the OFDM of the outputs from the two or more of the IDFT blocks onto the same RF port of the RF ports.

Another apparatus relates generally to OFDM. In such an apparatus, modulators are coupled to receive data inputs. Each of the modulators includes IDFT blocks. The IDFT blocks are coupled to output a first N-point transform, a second N-point transform, and a 2N-point transform from each of the modulators to provide discrete time domain signals for the data inputs. The 2N-point transform is a combination of the first N-point transform and the second N-point transform. A switch and frequency translation block is coupled to receive the discrete time domain signals. RF ports are coupled to the switch and frequency translation block. The switch and frequency translation block is configured to allocate a combination of outputs from two or more of the IDFT blocks to a same RF port of the RF ports and to translate frequency of at least one of the outputs from the two or more of the IDFT blocks to provide the OFDM of the outputs from the two or more of the IDFT blocks onto the same RF port of the RF ports. The switch and frequency translation block includes a first switch, a second switch, and a frequency translator all of which are coupled to a control signal bus. The first switch is coupled to receive the discrete time domain signals and first control signals from the control signal bus to select a subset of the discrete time domain signals for output from the first switch. The frequency translator includes center frequency translation blocks. The frequency translator is coupled to receive the subset of the discrete time domain signals and coupled to the control bus to receive second control signals to selectively set one or more of the center frequency translation blocks to corresponding center frequencies for output of two or more of the discrete time domain signals of the subset onto the same RF port of the RF ports. The second switch is coupled to receive the two or more of the discrete time domain signals and third control signals from the control bus for providing the two or more of the discrete time domain signals onto the same RF port of the RF ports.

A method relates generally to OFDM. In such a method, data inputs are obtained by modulators. Each of the modulators includes IDFT blocks. From the IDFT blocks, output are a first N-point transform and a second N-point transform to provide discrete time domain signals for the data inputs. A 2N-point transform is output from each of the modulators to provide the discrete time domain signals for the data inputs. The outputting of the 2N-point transform includes combining the first N-point transform and the second N-point transform to provide the 2N-point transform. The discrete time domain signals are provided to a switch and frequency translation block. A combination of the discrete time domain signals is allocated to a same RF port of RF ports. The allocating includes translating frequency of at least one of the outputs to provide OFDM of the outputs onto the same RF port of the RF ports.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Rather than a single carrier using all the available spectrum or bandwidth ("W") as in a single carrier QAM cable network, such spectrum may be divided into N narrow bands ("W/N") or subcarriers in a cable network using OFDM. Along those lines, data may be divided into multiple data streams, where each of such data streams may be transmitted on a separate band of such N narrow bands. Such data for OFDM may be transformed from a discrete frequency domain to a discrete time domain using an Inverse Discrete Fourier Transform ("IDFT"), which may be implemented as an Inverse Fast Fourier Transform ("IFFT").

However, there may be many channels on a same cable downstream feed, as channel bandwidth may be substantially smaller than cable bandwidth. Furthermore, cable bandwidth may vary depending on cable transmission medium used. For example, throughput or bandwidth of a cable transmission medium may vary depending on whether it is fiber optic or copper wire, as well as the size of such cabling. Furthermore, any intermediate nodes coupling cable transmission mediums, as well as usage rates, may affect throughput. Additionally, different channels may have different resolutions and/or frame rates, and thus channels may have different bandwidth demands. For example, a high-definition television ("HDTV") channel may use more bandwidth than a standard-definition television ("SDTV"), and enhanced-definition television ("EDTV") may use an amount of bandwidth between HDTV and SDTV usages. Accordingly, providing flexibility in terms of channel usage on a cable transmission medium may be useful for cable broadcasters in various markets.

As described below in additional detail, outputs of IFFT blocks of modulators of a cable headend are brought out for coupling to a switch and frequency translation block. Such switch and frequency translation block is coupled to RF ports, which may correspond to cable transmission mediums. If not all of such RF ports are actively used, such switch and frequency translation block may be used to couple outputs from two or more IFFT blocks onto a same RF port for a cable transmission medium. This flexibility may be advantageously used to provide different configurations of point transforms on a same cable transmission medium, namely channels with different bandwidths. Moreover, this flexibility may be advantageously used to increase modulator throughput for a subset of RF ports of a cable headend. Additionally, such flexibility may be used to provide legacy spectrum nulling support on any of a plurality of RF ports.

With the above general understanding borne in mind, various configurations for a cable headend are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
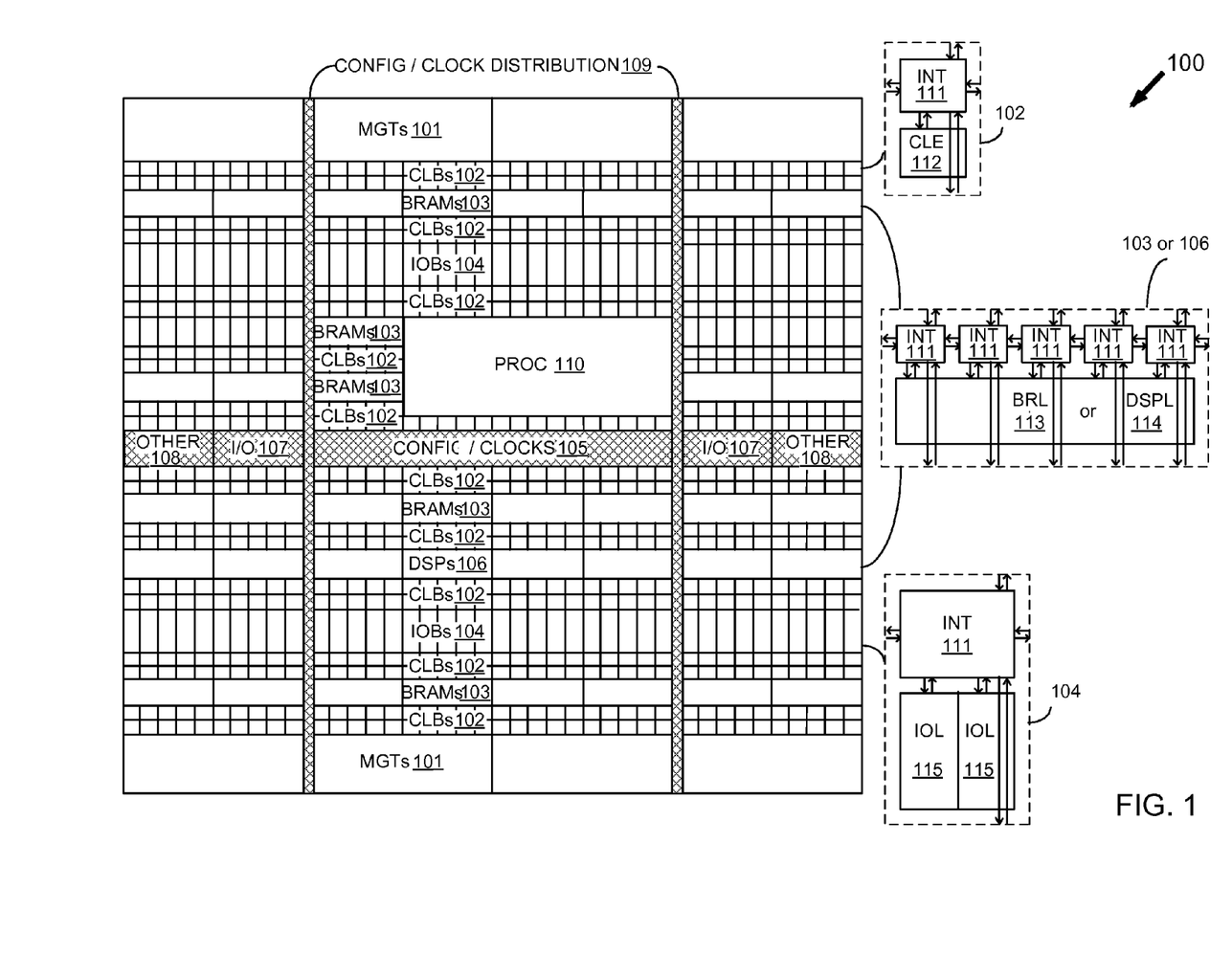
FIG. 1 is a simplified block diagram depicting an exemplary columnar Field Programmable Gate Array ("FPGA") architecture.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
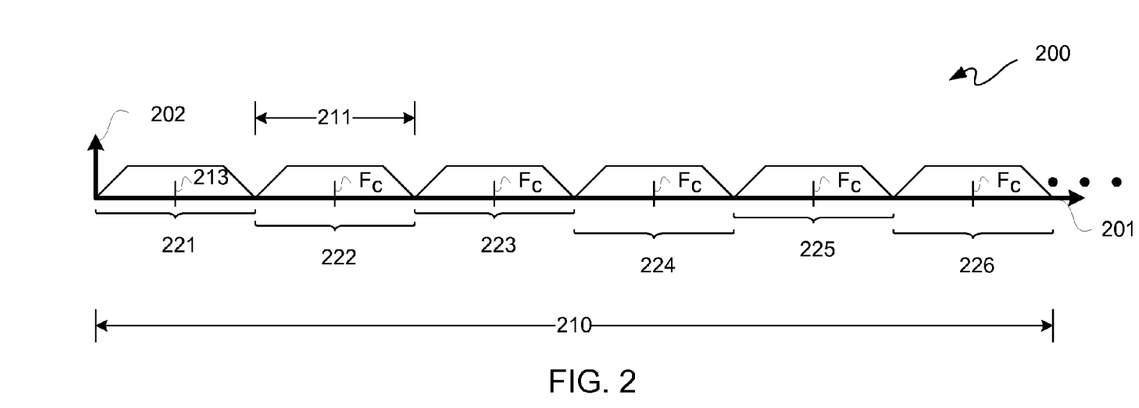
FIGS. 2 and 3 are respective signal diagrams depicting exemplary spectral views of respective signals on cable mediums.
Figure 3:
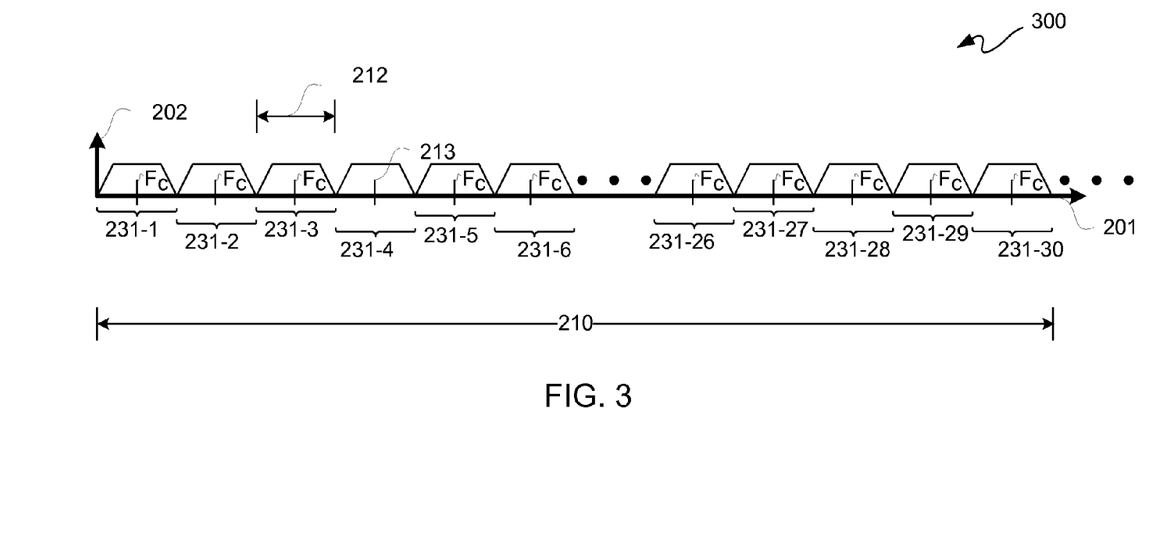

Even though the following description is in terms of an FPGA implementation, it should be understood that an ASIC, ASSP, or any other IC, or a combination of ICs, may be used in accordance with the following description. Furthermore, in OFDM, each subcarrier has a different frequency. Frequencies may be selected such that there is an integral number of cycles in a symbol period, where multiple signals within such a symbol period are mathematically orthogonal to one another. To visually illustrate this in additional detail, FIGS. 2 and 3 are respective signal diagrams depicting exemplary spectral views of respective signals 200 and 300 on cable mediums. Examples of cable mediums may include fiber optic cable, coaxial cable, a type of CAT cable, or other cable medium.

Signals 200 and 300 are both illustratively depicted as frequency 201 versus voltage 202 for an x- and y-axis, respectively. For purposes of clarity by way of example and not limitation, it shall be assumed that cable medium bandwidth 210 is a maximum of approximately 1.2 GHz. Furthermore, for purposes of clarity by way of example and not limitation, it shall be assumed that a maximum channel bandwidth 211 is approximately 200 MHz and a minimum channel bandwidth 212 is approximately 40 MHz. However, these and/or other bandwidths may be used.

In the example of signal 200, there are six channels, namely channels 221 through 226, within cable medium bandwidth 210. Each of channels 221 through 226 has a channel bandwidth 211 of approximately 200 MHz, and for each channel bandwidth of approximately 200 MHz, there may be at most six channels for cable medium bandwidth 210. However, in other configurations, fewer than six channels may be present within such a cable medium bandwidth 210. Each of channels 221 through 226 includes a respective center frequency, $F_C$, 213, which are different from one another. Along those lines, respective center frequencies 213 corresponding to channels 221 through 226 may be assigned or set so as to avoid having overlapping channels. Each of channels 221 through 226 may be a cavity or discrete spectral space in which discrete time domain signals of an N-point Inverse Discrete Fourier Transform ("IDFT") are present. Each of channels 221 through 226 may be used to transmit a respective discrete time domain signal.

In the example of signal 300, there are thirty channels, namely channels 231-1 through 231-30, within cable medium bandwidth 210. Each of channels 231-1 through 231-30 has a channel bandwidth 212 of approximately 40 MHz, and for each channel bandwidth of approximately 40 MHz, there may be at most thirty channels for bandwidth 210. However, in other configurations, fewer than thirty channels may be present within such a cable medium bandwidth 210. Each of channels 231-1 through 231-30 includes a respective center frequency, $F_C$, 213, which are different from one another. Along those lines, respective center frequencies 213 corresponding to channels 231-1 through 231-30 may be assigned or set so as to avoid having overlapping channels. Each of channels 231-1 through 231-30 may be a cavity or discrete spectral space in which discrete time domain signals of an N-point Inverse Discrete Fourier Transform ("IDFT") are present. Each of channels 231-1 through 231-30 may be used to transmit a respective discrete time domain signal.

Figure 4:
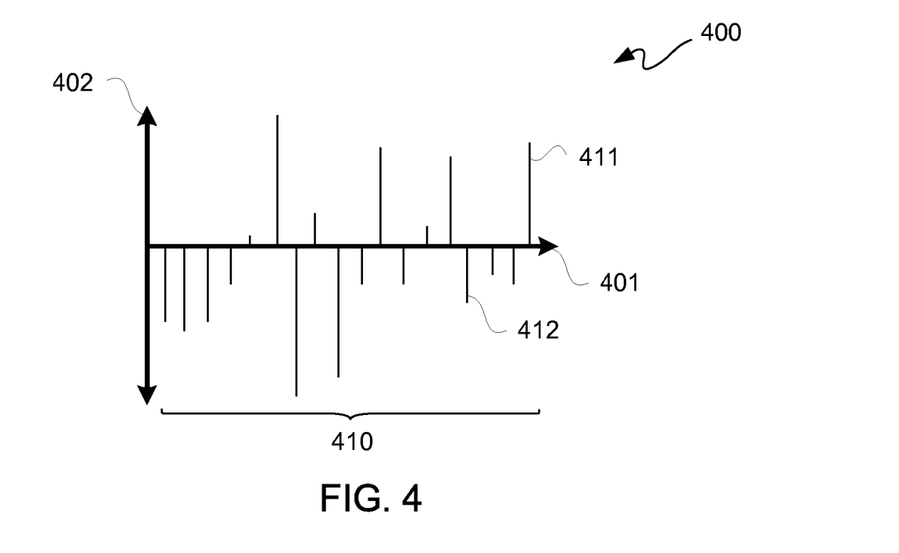
FIG. 4 is a signal diagram depicting an exemplary discrete time domain signal.

For purposes of clarity by way of example and not limitation, FIG. 4 is a signal diagram depicting an exemplary discrete time domain signal 400. Discrete time domain signal 400 is depicted along a time x-axis 401 and an amplitude y-axis 402. Discrete time domain signal 400 includes IDFT samples 410. For purposes of clarity and not limitation, it shall be assumed that an IDFT is provided with an Inverse Fast Fourier Transform ("IFFT"). IFFT output samples 410 may be obtained by inputting parallel data streams, such as from audio-visual ("AV") inputs for example, into an IFFT block. Even though AV inputs are described below as a form of data inputs for purposes of clarity by way of example, it should be understood that any type of data input that may be packetized, including without limitation Internet Protocol packets, may be used. Each of IFFT output samples 410 may be a sum of signal samples of such AV inputs. Such summation of signal samples may result in a positive amplitude IFFT output sample 411 of IFFT output samples 410, or such summation of signal samples may result in a negative amplitude IFFT output sample 412 of IFFT output samples 410. Such an IFFT block may perform modulation and multiplexing in a single operation for output of IFFT output samples 410. The number of samples or points of an IFFT block may be a set number. For purposes of clarity by way of example and not limitation, it shall be assumed that 8192-point or 4096-point IFFTs may be used.

Figure 5:
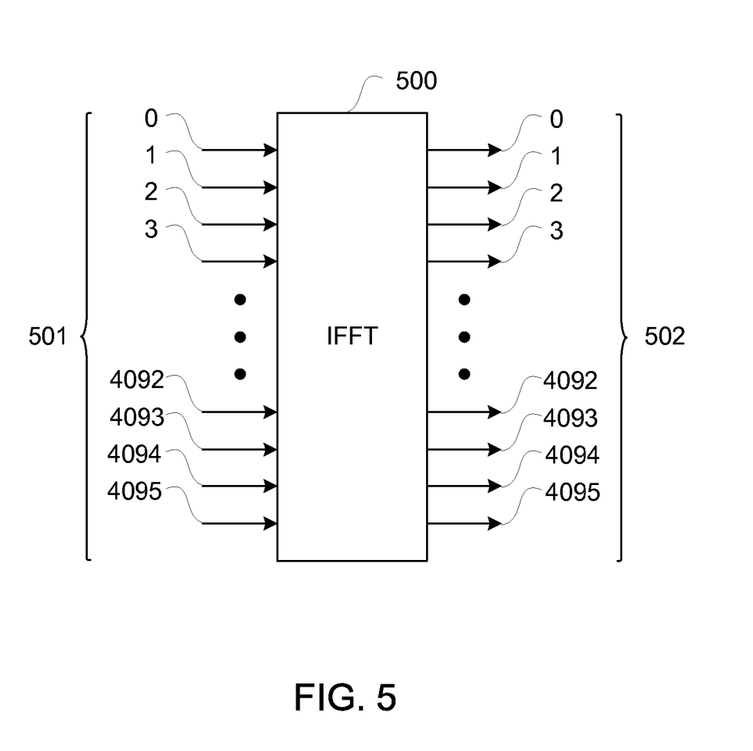
FIG. 5 is a block diagram depicting an exemplary Inverse Fast Fourier Transform block.

FIG. 5 is a block diagram depicting an exemplary IFFT block 500. IFFT block 500 has N-input ports 501, which in this example is a 4096-point input. Thus, in this example, there are 4096 inputs from points 0 through points 4095. Likewise, IFFT block 500 has N-output ports 502 corresponding to such N-input ports. All of such N-input ports 501 may be used for a same band; however, N-input ports 501 may be divided up into multiple sub-bands. Thus, for example, a channel may have a single band or multiple sub-bands. In other words, a channel may have a single carrier or multiple carriers or sub-carriers. Furthermore, to create a null space in a channel, a portion of points of N-input ports 501 may be nulled-out, so a corresponding portion of points of N-output ports 502 may have a null output. Effectively, this nulling may be used to create a spectral hole, or multiple spectral holes, in a channel. Thus, a legacy sub-band signal or signals, such as from a downstream QAM modulator, may be combined or added into such spectral hole.

Figure 6:
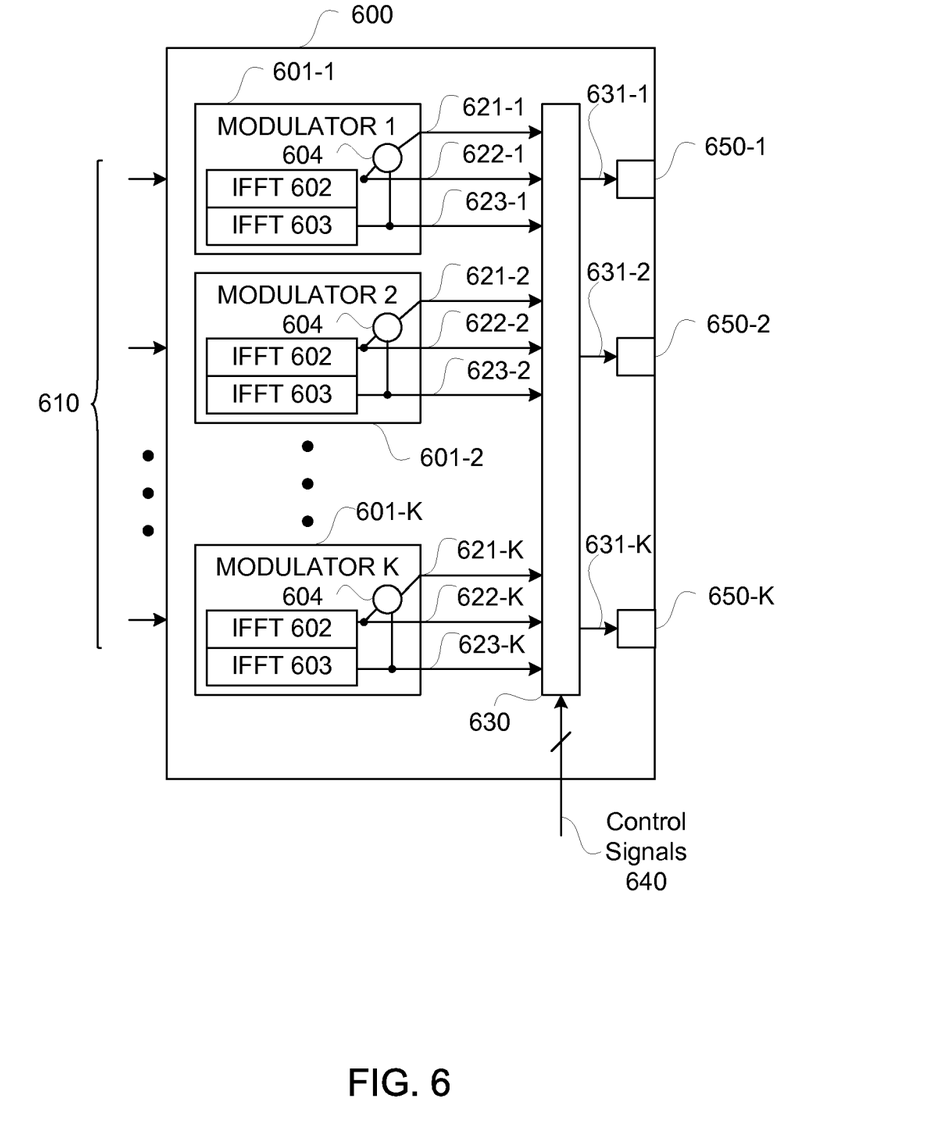
FIG. 6 is a block diagram depicting an exemplary modulator block.

FIG. 6 is a block diagram depicting an exemplary modulator block 600. Modulator block 600 may be implemented in an IC, such as FPGA 100 of FIG. 1 or another IC as described elsewhere herein. Modulator block 600 includes modulators 601-1 through 600-K for K a positive integer greater than one. In the above examples of channel and cable medium bandwidths, K may be equal to 6; however, fewer or more modulators may be used.

Modulators 601-1 through 601-K may be coupled to receive AV inputs 610. Each of modulators 601-1 through 601-K may include IDFT blocks, which in this example are IFFT blocks. In this example, each of modulators 601-1 through 601-K may include a pair of IFFT blocks 602 and 603. In this example, each of IFFT blocks 602 and 603 is a respective 4096-point IFFT block. Furthermore, each of modulators 601-1 through 601-K may include a combiner 604 coupled to combine outputs of IFFT blocks 602 and 603 respectively thereof. In this example, IFFT blocks 602 and 603 of each of modulators 601-1 through 601-K are coupled to output a first N-point transform and a second N-point transform, respectively, and a combiner 604 of each of modulators 601-1 through 601-K is coupled to output a 2N-point transform. Along those lines, outputs of IFFT blocks 602 and 603 are coupled to combiner 604 to combine them to provide such 2N-point transform. Along those lines, IFFT block 602 of each of modulators 601-1 through 601-K respectively outputs N-point transforms 622-1 through 622-K to provide discrete time domain signals for AV inputs 610, and IFFT block 603 of each of modulators 601-1 through 601-K respectively outputs N-point transforms 623-1 through 623-K to provide discrete time domain signals for AV inputs 610. Moreover, combiners 604 of modulators 601-1 through 601-K respectively output 2N-point transforms 621-1 through 621-K, respectively, to provide discrete time domain signals for AV inputs 610. Thus, for example, 2N-point transform 621-1 is a combination of N-point transforms 622-1 and 623-1.

Discrete time domain signals, such as 2N-point transforms 621-1 through 621-K (collectively "signals 621"), N-point transforms 622-1 through 622-K (collectively "signals 622"), and N-point transforms 623-1 through 623-K (collectively "signals 623"), may be coupled for input to a switch and frequency translation block 630. Control signals 640 may further be input to switch and frequency translation block 630. Responsive to control signals 640, switch and frequency translation block 630 may output one or more of discrete time domain signals 631-1 through 631-K (collectively "signals 631") respectively to RF ports 650-1 through 650-K. Switch and frequency translation block 630 may be configured to allocate a combination of outputs from two or more of modulators 601-1 through 601-K (collectively "modulators 601") to a same RF port of RF ports 650-1 through 650-K (collectively "RF ports 650"). Thus, for example N-point transform 621-1 through 621-K may all be Orthogonally Frequency-Division Multiplexed on a same discrete time domain signal 631-1 for RF port 650-1. Switch and frequency translation block 630 may be configured to translate frequency of at least one of signals 621, 622, and/or 623 from one or more of modulators 601-1 through 601-K to provide Orthogonally Frequency-Division Multiplexing ("OFDM") of such outputs sourced from two or more of IDFT blocks, such as IFFT blocks 602 or 603, onto the same RF port of RF ports 650.

Signal values of discrete time domain signals 631 represent sums of numerous samples of parallel data streams of AV inputs 610 provided by modulators 601. If a modulator of modulators 601 is not active for a corresponding RF port 650, then output of such modulator 601 may be used on another RF port 650. Continuing the above example of six modulators 601, there may be six corresponding RF ports 650. If one or more of such six RF ports 650 are not in use, then, via switch and frequency translation block 630, outputs from two or more modulators 601 may be provided to a same RF port 650.

An IDFT may modulate and multiplex parallel data streams to provide discrete time domain signals. These signals may have different numbers of points. For example, each of signals 622 and 623 may be respective 4096 point transforms. Modulators 601 may be of a cable headend for a downstream link. In another configuration, modulators 601 may be of a cable modem for an upstream link. For purposes of clarity by way of example and not limitation, it shall be assumed that modulators 601 are for a cable headend. RF ports 650 may be of such cable headend, and such cable headend may be capable of outputting six RF signals via RF ports 650, which may have different channels thereon as previously described.

Signals 621, 622, or 623 output from two or more of IFFT blocks 602 and/or 603, whether singly or in combination via combiners 604, may be provided on a same RF port of RF ports 650. For signals 621 being 8192-point signals and signals 622 and 623 being 4096-point signals which may be combined onto a same RF port as OFDM signals, combinations of such signals for a six RF port modulator block 600 on a same RF port may be selected from a group consisting of six 8192-point OFDM signals, twelve 4096-point OFDM signals, one 8192-point OFDM signal and ten 4096-point signals, three 8192-point OFDM signals and six 4096-point signals, or any other combination of 8192-point OFDM signals and 4096-point signals.

Figure 7:
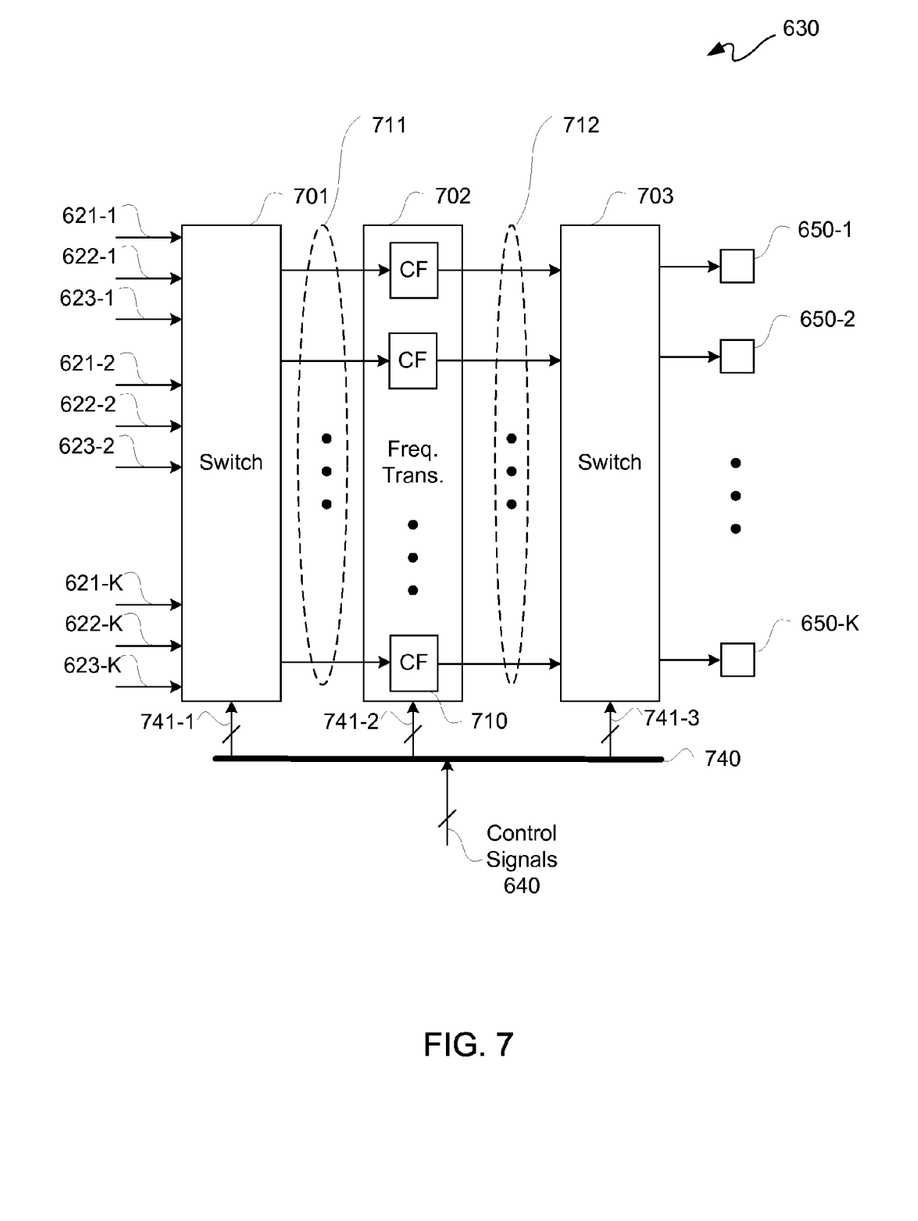
FIG. 7 is a block diagram depicting an exemplary switch and frequency translation block 630.

FIG. 7 is a block diagram depicting an exemplary switch and frequency translation block 630. Switch and frequency translation block 630 includes a front switch 701, a back switch 703, and a frequency translator 702 located between switches 701 and 703, all of which are coupled to a control signal bus 740. Front switch 701 may be coupled to receive discrete time domain signals 621 through 623 and control signals 741-1 of control signals 640 from control signal bus 740 to select a subset of discrete time domain signals 621 through 623, namely discrete time domain signals 711, for output from front switch 701. Discrete time domain signals 711 may be input to corresponding center frequency translation blocks 710 of frequency translator 702. Frequency translator 702, which is coupled to receive discrete time domain signals 711, may be coupled to control bus 740 to receive control signals 741-2 of control signals 640 to selectively set one or more respective center frequencies of center frequency translation blocks 710 to corresponding center frequencies for output of discrete time domain signals 712. Back switch 703 may output two or more of discrete time domain signals 712 onto the same RF port of RF ports 650, such as RF port 650-1 for example. Back switch 703 may be coupled to receive two or more discrete time domain signals 712 and control signals 741-3 of control signals 640 from control bus 740 for providing two or more of discrete time domain signals 712 onto the same RF port of RF ports 650.

Figure 8:
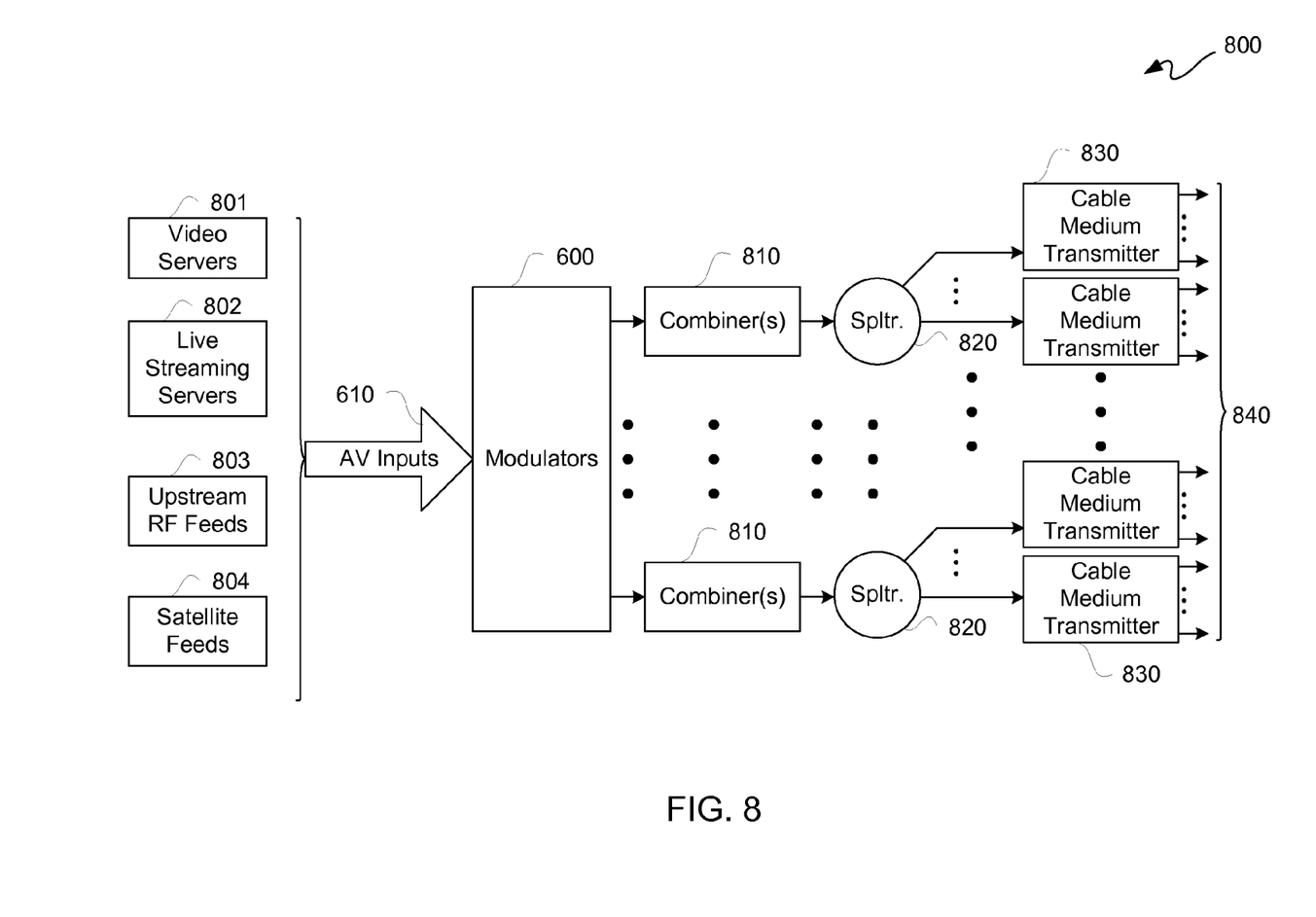
FIG. 8 is a block diagram depicting an exemplary cable headend.

FIG. 8 is a block diagram depicting an exemplary cable headend 800. AV inputs 610 may be provided from any of a variety of sources to modulators 601 of modulator block 600 of cable headend 800. Examples of such AV sources may include one or more of any one or more of video servers 801, live streaming servers 802, upstream RF feeds 803, and/or satellite feeds 804, among other AV sources. Outputs on RF ports 650 of FIG. 6 may be provided to combiners 810 of cable headend 800, and outputs of combiners 810 may be provided as inputs to splitters 820 of cable headend 800. Outputs of splitters 820 may be provided as inputs to cable medium transmitters 830 for transmission via cable mediums 840.

Figure 9:
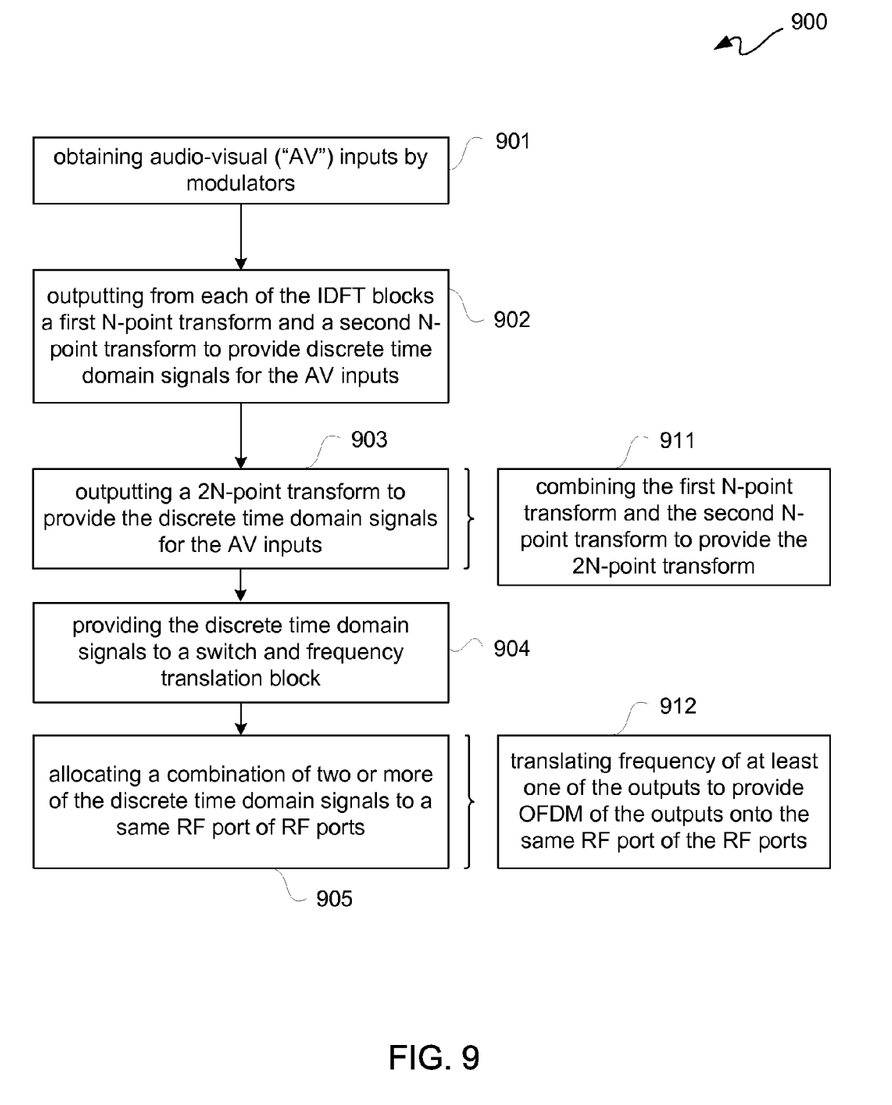
FIG. 9 is a flow diagram depicting an exemplary radio frequency ("RF") modulation flow.

FIG. 9 is a flow diagram depicting an exemplary RF modulation flow 900. At 901, AV inputs 610 may be obtained by modulators 601. Each of modulators 601 may include IDFT blocks, such as IFFT blocks for example. At 902, IDFT blocks may output a first N-point transform and a second N-point transform to provide discrete time domain signals for such AV inputs 610. At 903, a 2N-point transform may be output from each of modulators 601 to further provide such discrete time domain signals for such AV inputs 610. Outputting of such 2N-point transform at 903 may include combining at 911 such first N-point transform and such second N-point transform to provide such 2N-point transform. At 904, such discrete time domain signals may be provided to a switch and frequency translation block 630. At 905, a combination of outputs from two or more of such discrete time domain signals may be allocated or otherwise switched onto a same RF port of RF ports. Allocating of such combination of outputs at 905 may include at 912 translating frequency of at least one of such outputs to provide OFDM of such outputs onto the same RF port of RF ports 650.

Figure 10:
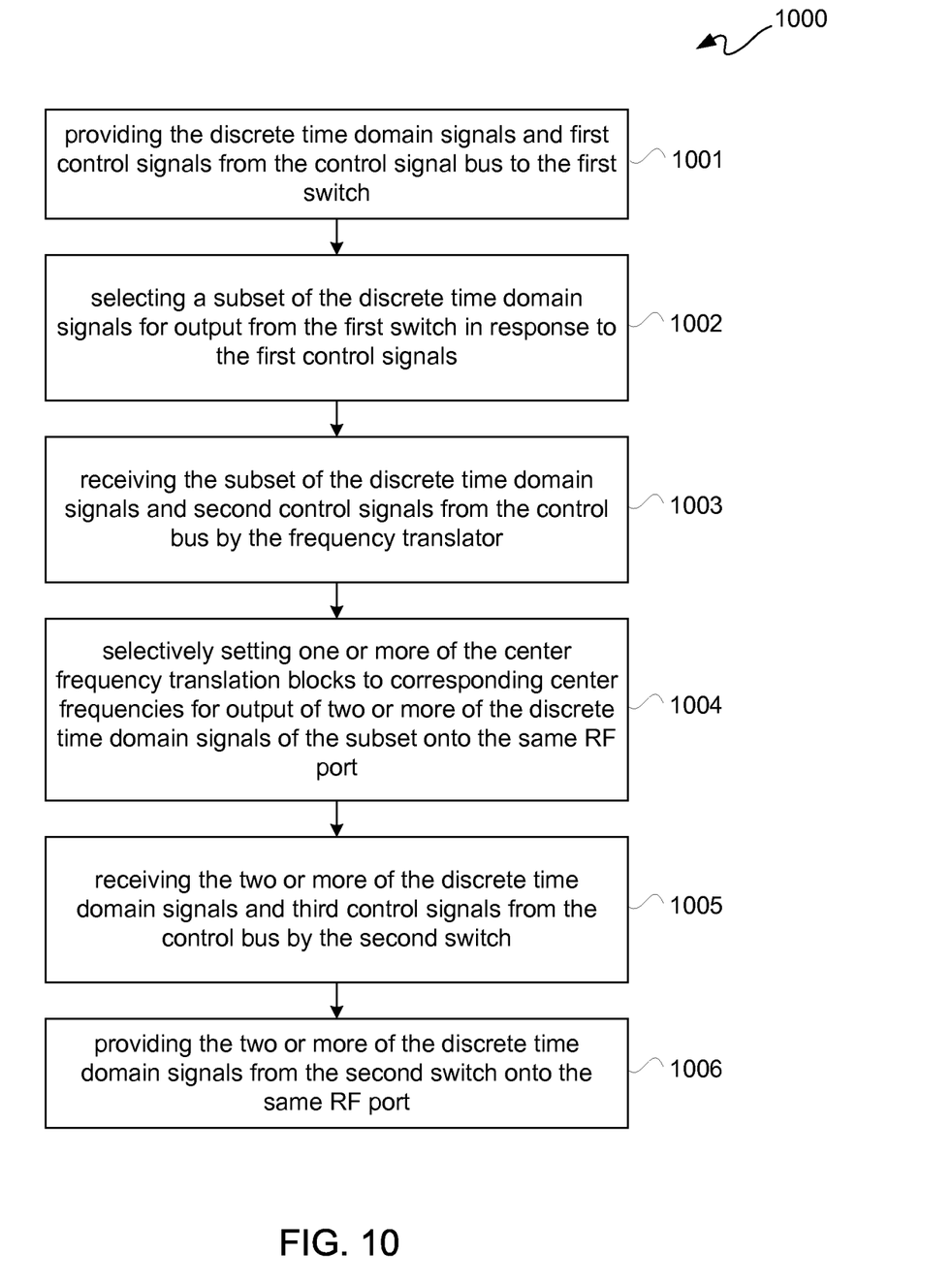
FIG. 10 is a flow diagram depicting an exemplary switching and frequency translating flow.

Switch and frequency translation block 630 may include a first switch, a second switch, and a frequency translator all of which are coupled to a control signal bus, such as previously described. FIG. 10 is a flow diagram depicting an exemplary switching and frequency translating flow 1000. Switching and frequency translating flow 1000 may be used for allocating at 904.

At 1001, discrete time domain signals provided at 903 may be provided along with control signals 741-1 from control signal bus 740 to front switch 701. At 1002, a subset of such discrete time domain signals may be selected for output from front switch 701 in response to such control signals 741-1. At 1003, such subset of such discrete time domain signals may be received along with control signals 741-2 from control bus 740 by frequency translator 702.

At 1004, one or more center frequency translation blocks 710 may be selectively set to corresponding center frequencies for output of two or more of such discrete time domain signals of such subset onto a same RF port. At 1005, these two or more of such discrete time domain signals, as well as control signals 741-3 from control bus 740, may be received by back switch 703. At 1006, such two or more of such discrete time domain signals from back switch 703 may be provided onto the same RF port.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus, comprising:
   modulators coupled to receive data inputs;
   wherein each of the modulators includes Inverse Discrete Fourier Transform ("IDFT") blocks;
   wherein the IDFT blocks are coupled to output a first N-point transform, a second N-point transform, and a 2N-point transform from each of the modulators to provide discrete time domain signals for the data inputs;
   wherein the 2N-point transform is a combination of the first N-point transform and the second N-point transform;
   a switch and frequency translation block coupled to receive the discrete time domain signals; and
   RF ports coupled to the switch and frequency translation block;
   wherein the switch and frequency translation block is configured to allocate a combination of outputs from two or more of the IDFT blocks to a same RF port of the RF ports and to translate frequency of at least one of the outputs from the two or more of the IDFT blocks to provide Orthogonally Frequency-Division Multiplexing ("OFDM") of the outputs from the two or more of the IDFT blocks onto the same RF port of the RF ports.

2. The apparatus according to claim 1, wherein the IDFT blocks are Inverse Fast Fourier Transform ("IFFT") blocks.

3. The apparatus according to claim 1, wherein signal values of the discrete time domain signals represent sums of numerous samples of parallel data streams of the data inputs.

4. The apparatus according to claim 1, wherein the IDFT modulates and multiplexes the parallel data streams to provide the discrete time domain signals.

5. The apparatus according to claim 1, wherein each of the first N-point transform and the second N-point transform are respective 4096 point transforms.

6. The apparatus according to claim 1, wherein the modulators are of a cable headend for a downstream link.

7. The apparatus according to claim 6, wherein the RF ports of the cable headend are six in total.

8. The apparatus according to claim 7, wherein the outputs from the two or more of the IDFT blocks on the same RF port of the RF ports are selected from a group consisting of six 8192-point OFDM signals, twelve 4096-point OFDM signals, one of the 8192-point OFDM signals and ten of the 4096-point OFDM signals, three of the 8192-point OFDM signals and six of the 4096-point signals, or any other combination of the 8192-point OFDM signals and the 4096-point signals.

9. An apparatus, comprising:
   modulators coupled to receive data inputs;
   wherein each of the modulators includes Inverse Discrete Fourier Transform ("IDFT") blocks;
   wherein the IDFT blocks are coupled to output a first N-point transform, a second N-point transform, and a 2N-point transform from each of the modulators to provide discrete time domain signals for the data inputs;
   wherein the 2N-point transform is a combination of the first N-point transform and the second N-point transform;

a switch and frequency translation block coupled to receive the discrete time domain signals;

RF ports coupled to the switch and frequency translation block;

wherein the switch and frequency translation block is configured to allocate a combination of outputs from two or more of the IDFT blocks to a same RF port of the RF ports and to translate frequency of at least one of the outputs from the two or more of the IDFT blocks to provide Orthogonally Frequency-Division Multiplexing ("OFDM") of the outputs from the two or more of the IDFT blocks onto the same RF port of the RF ports;

wherein the switch and frequency translation block includes a first switch, a second switch, and a frequency translator all of which are coupled to a control signal bus;

wherein the first switch is coupled to receive the discrete time domain signals and first control signals from the control signal bus to select a subset of the discrete time domain signals for output from the first switch;

wherein the frequency translator includes center frequency translation blocks;

wherein the frequency translator is coupled to receive the subset of the discrete time domain signals and coupled to the control bus to receive second control signals to selectively set one or more of the center frequency translation blocks to corresponding center frequencies for output of two or more of the discrete time domain signals of the subset onto the same RF port of the RF ports; and wherein the second switch is coupled to receive the two or more of the discrete time domain signals and third control signals from the control bus for providing the two or more of the discrete time domain signals onto the same RF port of the RF ports.

10. The apparatus according to claim 9, wherein the modulators are of a cable modem for an upstream link.

11. A method, comprising:
obtaining data inputs by modulators;
wherein each of the modulators includes Inverse Discrete Fourier Transform ("IDFT") blocks;
outputting from the IDFT blocks a first N-point transform and a second N-point transform to provide discrete time domain signals for the data inputs,
outputting a 2N-point transform from each of the modulators to provide the discrete time domain signals for the data inputs;
wherein the outputting of the 2N-point transform includes combining the first N-point transform and the second N-point transform to provide the 2N-point transform;
providing the discrete time domain signals to a switch and frequency translation block; and
allocating a combination of the discrete time domain signals to a same RF port of RF ports;
wherein the allocating includes translating frequency of at least one of the outputs to provide Orthogonally Frequency-Division Multiplexing ("OFDM") of the outputs onto the same RF port of the RF ports.

12. The method according to claim 11, wherein the IDFT blocks are Inverse Fast Fourier Transform ("IFFT") blocks.

13. The method according to claim 11, wherein signal values of the discrete time domain signals represent sums of numerous samples of parallel data streams of the data inputs.

14. The method according to claim 11, wherein the IDFT modulates and multiplexes the parallel data streams to provide the discrete time domain signals.

15. The method according to claim 11, wherein each of the first N-point transform and the second N-point transform are respective 4096 point transforms.

16. The method according to claim 11, wherein the modulators are of a cable headend.

17. The method according to claim 16, wherein the RF ports of the cable headend are six in total.

18. The method according to claim 17, wherein the outputs from the two or more of the IDFT blocks on the same RF port of the RF ports are selected from a group consisting of six 8192-point OFDM signals, twelve 4096-point OFDM signals, one of the 8192-point OFDM signals and ten of the 4096-point signals, three of the 8192-point OFDM signals and six of the 4096-point signals, or any other combination of the 8192-point OFDM signals and the 4096-point signals.

19. The method according to claim 11, further comprising:
wherein the switch and frequency translation block includes a first switch, a second switch, and a frequency translator all of which are coupled to a control signal bus;
providing the discrete time domain signals and first control signals from the control signal bus to the first switch;
selecting a subset of the discrete time domain signals for output from the first switch in response to the first control signals;
wherein the frequency translator includes center frequency translation blocks;
receiving the subset of the discrete time domain signals and second control signals from the control bus by the frequency translator;
selectively setting one or more of the center frequency translation blocks to corresponding center frequencies for output of two or more of the discrete time domain signals of the subset onto the same RF port of the RF ports;
receiving the two or more of the discrete time domain signals and third control signals from the control bus by the second switch; and
providing the two or more of the discrete time domain signals from the second switch onto the same RF port of the RF ports.

20. The method according to claim 11, wherein the modulators are of a cable modem for an upstream link.

* * * * *